(12) United States Patent
Ichikawa

(10) Patent No.: US 11,639,106 B2
(45) Date of Patent: May 2, 2023

(54) VEHICLE DISPLAY DEVICE

(71) Applicant: Yazaki Corporation, Tokyo (JP)

(72) Inventor: Junichi Ichikawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/592,473

(22) Filed: Feb. 3, 2022

(65) Prior Publication Data

US 2022/0250473 A1 Aug. 11, 2022

(30) Foreign Application Priority Data

Feb. 8, 2021 (JP) .............................. JP2021-017947

(51) Int. Cl.
*B60K 35/00* (2006.01)
(52) U.S. Cl.
CPC ........ *B60K 35/00* (2013.01); *B60K 2370/149* (2019.05); *B60K 2370/1529* (2019.05)
(58) Field of Classification Search
CPC ............ B60K 35/00; B60K 2370/1529; B60K 2370/149
See application file for complete search history.

(56) References Cited

U.S. PATENT DOCUMENTS

| 6,992,578 B2 * | 1/2006 | Aoki ................. G02B 27/0149 345/9 |
| 2014/0268359 A1 * | 9/2014 | Yuki ..................... G02B 5/205 359/630 |
| 2018/0267307 A1 | 9/2018 | Yoshida et al. |
| 2018/0335623 A1 | 11/2018 | Arai et al. |

FOREIGN PATENT DOCUMENTS

| DE | 102007024076 A1 * | 5/2008 | ............ B60K 35/00 |
| JP | 5689910 B2 | 3/2015 | |
| JP | 2019-89480 A | 6/2019 | |
| WO | 2017/122300 A1 | 7/2017 | |
| WO | WO-2017122300 A1 * | 7/2017 | ............ B60K 35/00 |

* cited by examiner

*Primary Examiner* — Doon Y Chow
*Assistant Examiner* — Dennis Chow
(74) *Attorney, Agent, or Firm* — Kenealy Vaidya LLP

(57) ABSTRACT

A vehicle display device includes: an image display configured to emit display light of an image; an optical system configured to project the display light emitted from the image display onto a reflection face ahead of a driver; and an adjustment part provided in an optical path of the display light from the image display to the reflection face, in which the image includes: a first region visible to both eyes of the driver; and a second region that is closer to ends in the image width direction than the first region in the image is, the adjustment part is disposed at a position corresponding to the boundary between the first region and the second region, and the adjustment part is configured such that the amount of the display light penetrating the adjustment part is reduced toward the ends in the image width direction.

4 Claims, 10 Drawing Sheets

GW

GW

VEHICLE DISPLAY DEVICE

CROSS-REFERENCE TO RELATED APPLICATION(S)

The present application claims priority to and incorporates by reference the entire contents of Japanese Patent Application No. 2021-017947 filed in Japan on Feb. 8, 2021.

BACKGROUND OF THE INVENTION

1. Field of the Invention

The present invention relates to a vehicle display device.

2. Description of the Related Art

There are conventional devices for displaying an image in a vehicle. Japanese Patent No. 5689910 discloses a head-up display device including a mirror. The mirror is disposed inside a housing and reflects image light to display the image light as a virtual image within a front visual field of a user outside the housing. Inside the housing, a translucent layer is provided on an optical path of the image light, and the light transmittance of the translucent layer gradually decreases toward the outer edge of the virtual image. Japanese Patent No. 5689910 describes the head-up-display device that, in the case of displaying no virtual image, causes no pattern to be left around a virtual image, achieves a better appearance, thereby enhancing marketability.

There is room for study on the enhancement of the visibility of an image. For example, in the case of projecting an image having a region visible to both eyes and a region not visible to both eyes, the visibility of the image tends to be lower in the boundary between the regions. It is preferable to prevent a decrease in the visibility of the image in the boundary between the regions.

SUMMARY OF THE INVENTION

An object of the present invention is to provide a vehicle display device capable of preventing a decrease in the visibility of an image having a region not visible to both eyes when the image is projected.

In order to achieve the above mentioned object, a vehicle display device according to one aspect of the present invention includes an image display configured to emit display light of an image; an optical system configured to project the display light emitted from the image display onto a reflection face ahead of a driver; and an adjustment part provided in an optical path of the display light from the image display to the reflection face, wherein the image includes: a first region visible to both eyes of the driver; and a second region that is a region closer to ends in an image width direction than the first region in the image is, the adjustment part is disposed at a position corresponding to a boundary between the first region and the second region, and the adjustment part is configured such that an amount of the display light penetrating the adjustment part is reduced toward the ends in the image width direction.

According to another aspect of the present invention, in the vehicle display device, it is preferable that the adjustment part has a gradation in which light transmittance decreases toward the ends in the image width direction.

According to still another aspect of the present invention, in the vehicle display device, it is preferable that the adjustment part includes a plurality of holes through which the display light passes, the holes are arranged along the image width direction, and opening areas of the holes become smaller toward the ends in the image width direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a vehicle display device according to an embodiment of the present invention will be described in detail with reference to the drawings. Note that the present invention shall not be limited by the embodiment. In addition, constituent elements in the following embodiment include those that can be easily assumed by those skilled in the art or those that are substantially the same.

Embodiment

Figure 1:
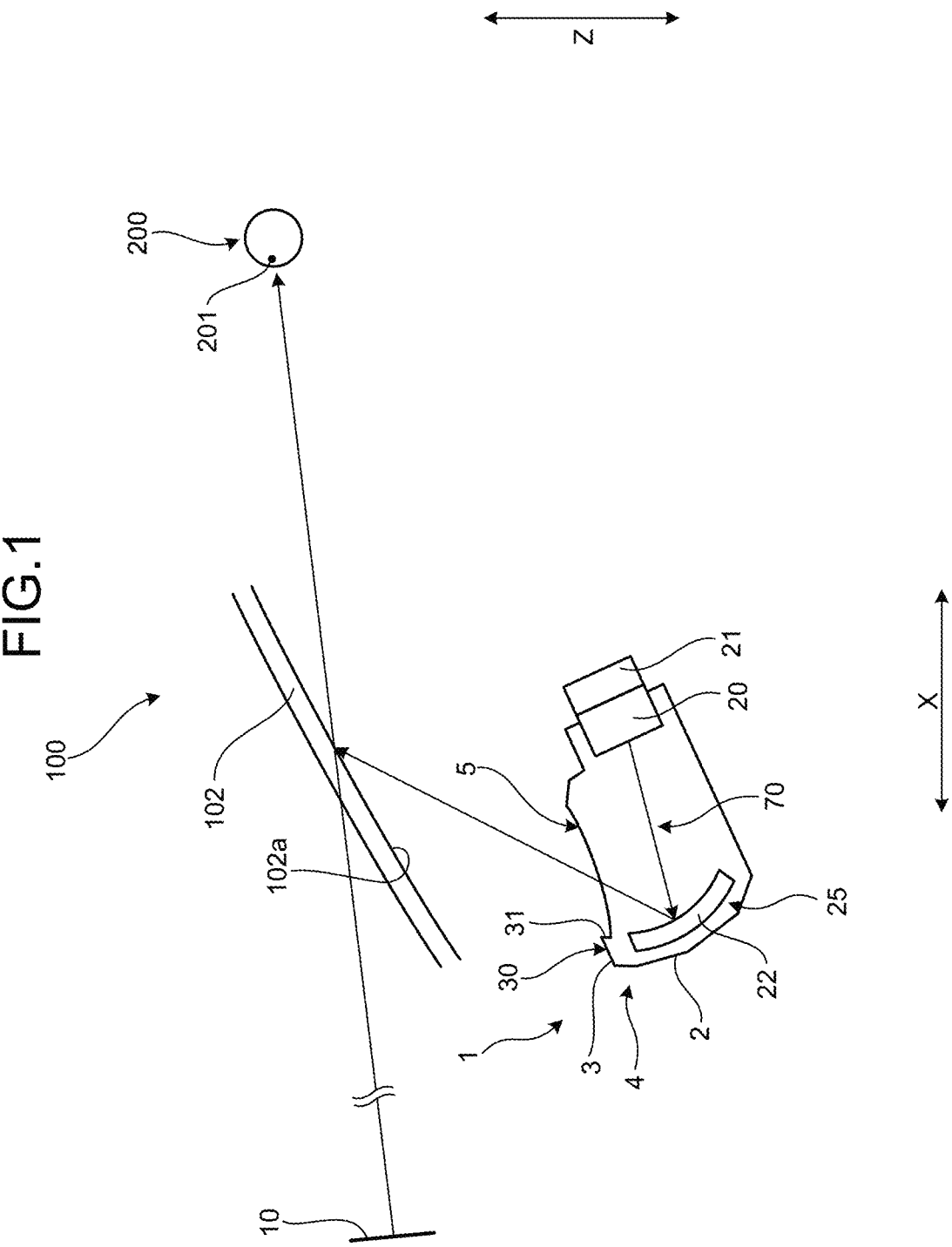
FIG. 1 is a diagram illustrating an arrangement of a vehicle display device according to an embodiment.
Figure 2:
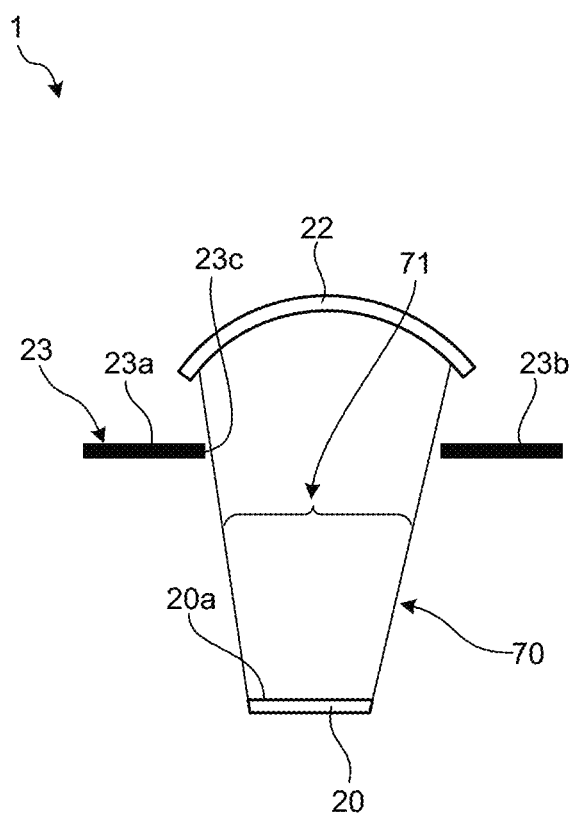
FIG. 2 is a plan view of a light-shielding wall according to the embodiment.
Figure 3:
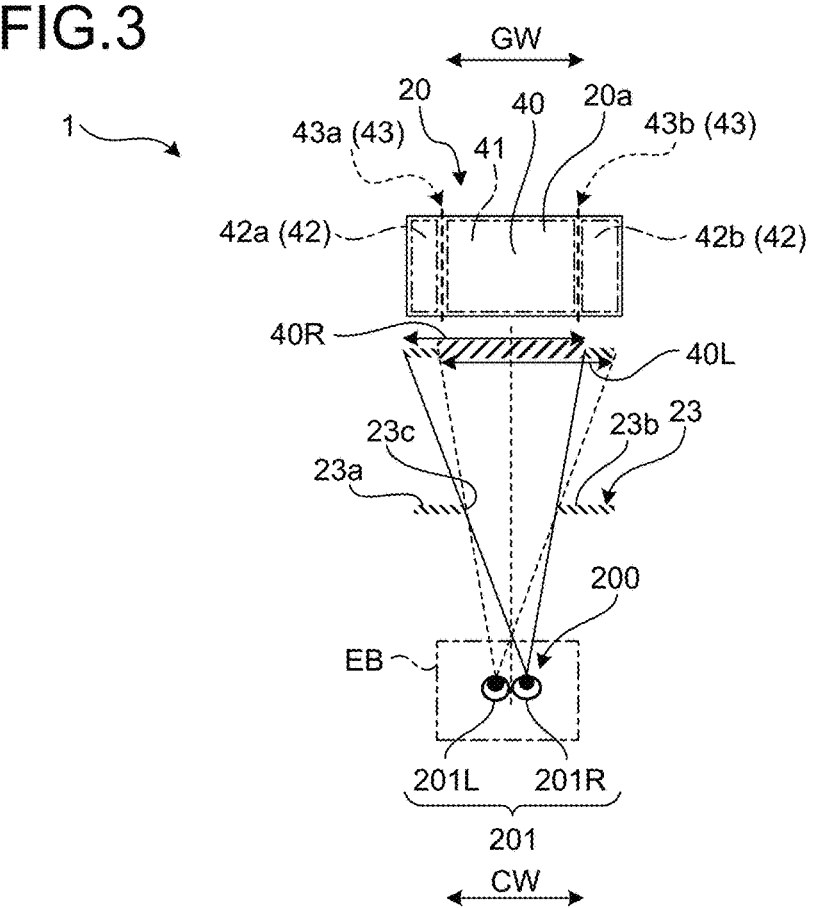
FIG. 3 is a diagram illustrating a range visible to right and left eyes.
Figure 4:
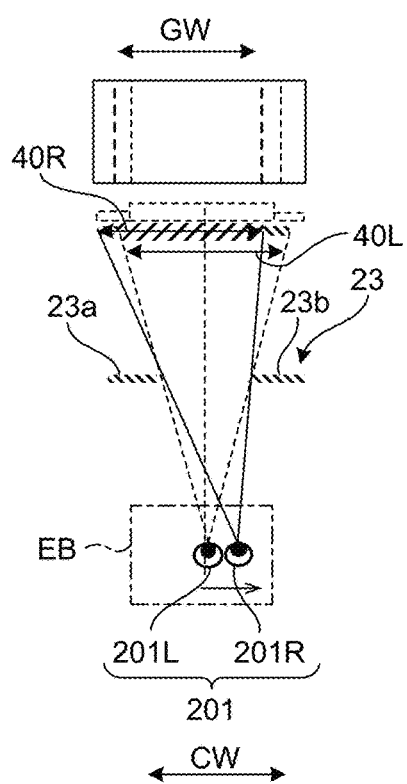
FIG. 4 is a diagram illustrating a range visible to right and left eyes.
Figure 5:
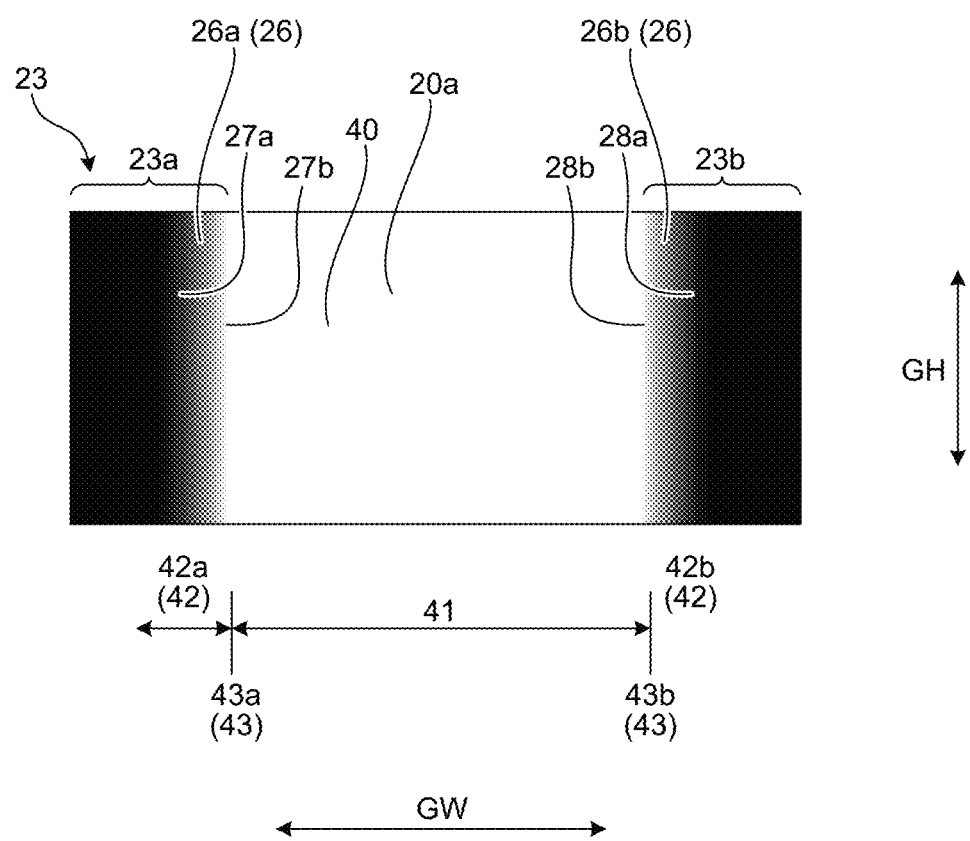
FIG. 5 is a front view of the light-shielding wall according to the embodiment.
Figure 6:
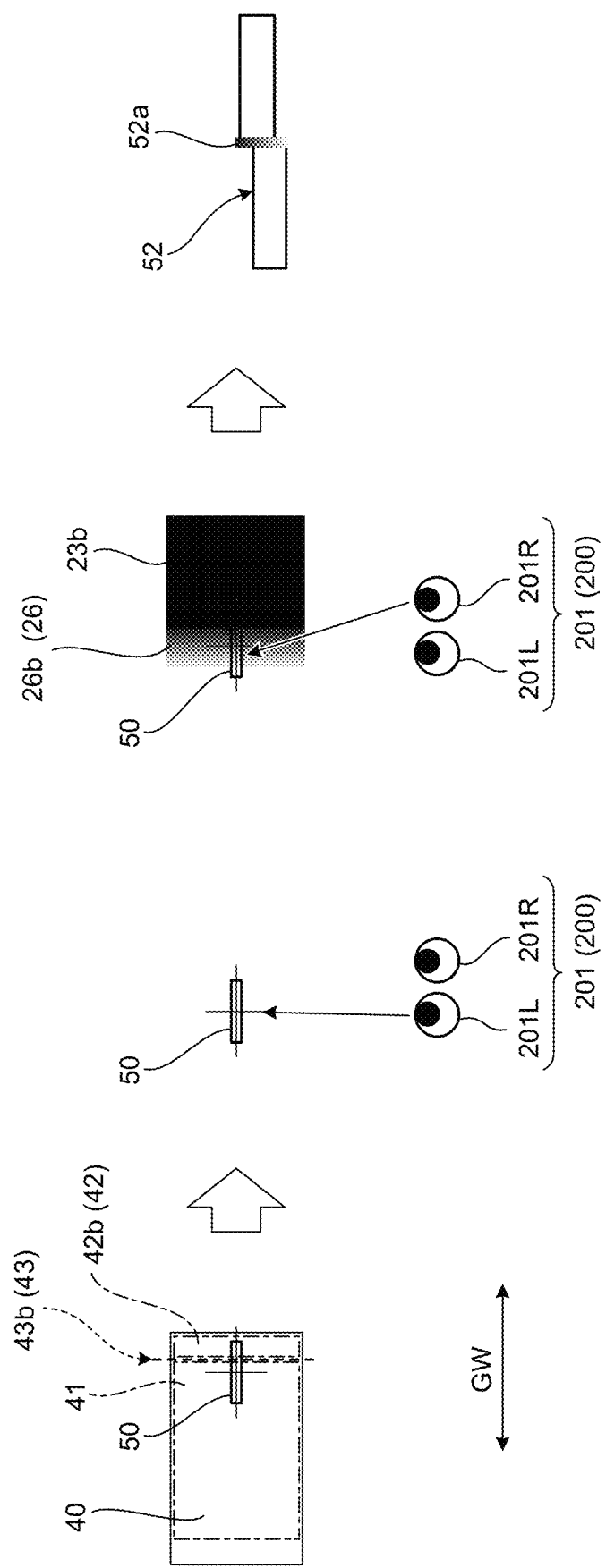
FIG. 6 is a diagram for explaining how a figure image is viewed in the embodiment.
Figure 7:
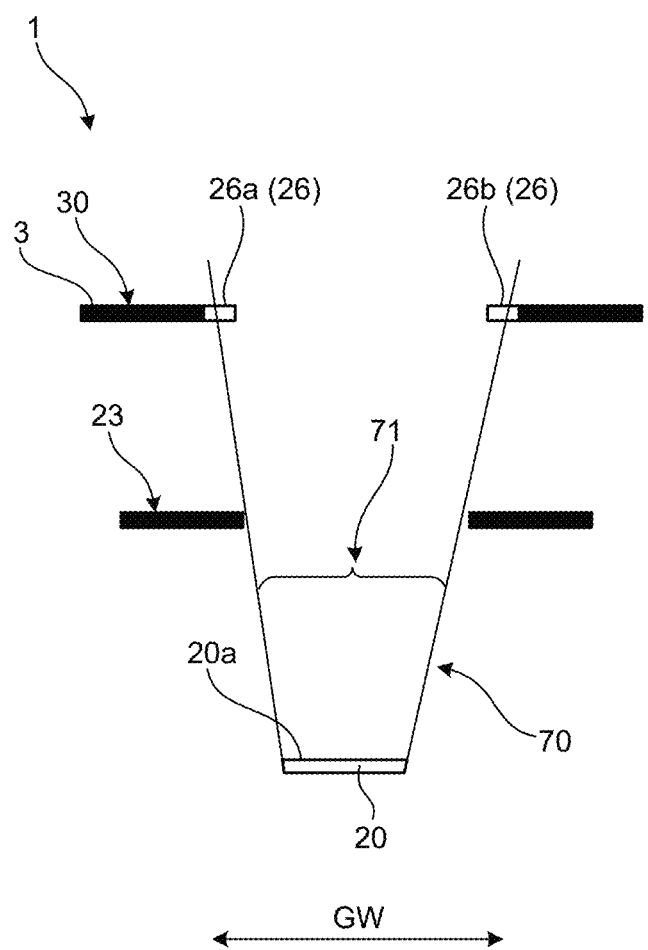
FIG. 7 is a diagram of an adjustment part provided in a cover member.
Figure 8:
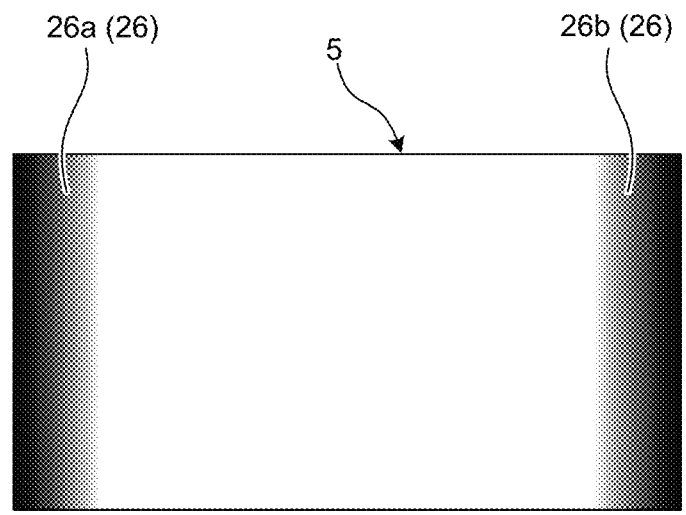
FIG. 8 is a diagram of an adjustment part provided in a cover.
Figure 9:
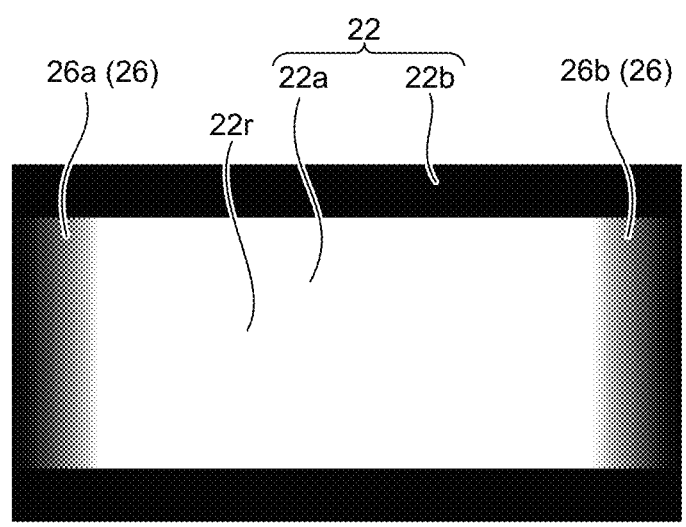
FIG. 9 is a diagram of an adjustment part provided in a first mirror.

With reference to FIG. 1 to FIG. 9, an embodiment will be described. The present embodiment relates to a vehicle display device. FIG. 1 is a diagram illustrating an arrangement of the vehicle display device according to the embodiment; FIG. 2 is a plan view of a light-shielding wall according to the embodiment; FIG. 3 and FIG. 4 are diagrams each illustrating a range visible to right and left eyes; FIG. 5 is a front view of the light-shielding wall according to the embodiment; FIG. 6 is a diagram for explaining how a figure image is viewed in the embodiment; FIG. 7 is a diagram of an adjustment part provided in a cover member; FIG. 8 is a diagram of the adjustment part provided in a cover; and FIG. 9 is a diagram of the adjustment part provided in a first mirror.

As illustrated in FIG. 1, a vehicle display device 1 according to the present embodiment is installed in a vehicle 100, and constitutes a head-up display. The vehicle display device 1 is disposed inside an instrument panel, for example. The instrument panel is provided with an opening through which display light 70 passes.

The vehicle display device 1 includes a casing 4, a cover 5, an image display 20, and an optical system 25. The image display 20 and the optical system 25 are accommodated in the casing 4. The casing 4 includes a main body 2 and a cover member 3 engaged with the main body 2. The main body 2 includes an opening opened upward. The cover member 3 closes the opening of the main body 2 from above. The cover member 3 includes a wall 30 facing a windshield 102 in a vehicle vertical direction Z. When viewed from the top, the cover member 3 has the shape of a rectangular frame. The wall 30 includes an opening 31 opened upward. The cover 5 is a transparent plate member closes the opening 31 of the cover member 3. The cover 5 is formed from, for example, a translucent resin, such as polycarbonate (PC) or acrylics.

The image display 20 is a device configured to emit the display light 70 of an image. The illustrated image display 20 is a liquid crystal display device, such as a thin film transistor-liquid crystal display (TFT-LCD). The image display 20 is configured to emit the display light 70 by the use of the light of a backlight unit, for example. A heat sink 21 is disposed on the back face of the image display 20. Note that the image display 20 is not limited to a liquid crystal display device. The image display 20 may be a device configured to produce an image on a transmissive screen by scanning laser light.

The optical system 25 includes a first mirror 22. The first mirror 22 reflects the display light 70 emitted from the image display 20, toward a reflection face 102a of the windshield 102. The shape of a reflection face of the first mirror 22 is a free-curved surface, for example. The illustrated first mirror 22 is a concave mirror that reflects the display light 70 while making the display light 70 expand.

The display 70 reflected by the first mirror 22 passes through the opening 31, and is reflected by the reflection face 102a of the windshield 102 toward a driver 200. The reflection face 102a of the windshield 102 is a final reflection face facing eyes 201 of the driver 200. A virtual image 10 is formed by the display light 70 incident on the eyes 201 of the driver 200.

The vehicle display device 1 according to the present embodiment is configured to be capable of displaying a virtual image while superimposing the virtual image on a foreground of the vehicle 100. For example, the vehicle display device 1 displays a virtual image while superimposing the virtual image on a road surface ahead of the vehicle 100, a vehicle ahead of the vehicle 100, an attention object ahead of the vehicle 100, or the like.

As illustrated in FIG. 2, the image display 20 has a display face 20a that displays an image. The display light 70 is emitted from the display face 20a. The vehicle display device 1 includes a light-shielding wall 23. The light-shielding wall 23 is a wall configured to prevent the display light 70 from scattering in an unnecessary direction. The illustrated light-shielding wall 23 is disposed between the display face 20a of the image display 20 and the first mirror 22. The light-shielding wall 23 includes a first light-shielding wall 23a and a second light-shielding wall 23b. The first light-shielding wall 23a is positioned on the left side of an image when viewed from the driver 200. The second light-shielding wall 23b is positioned on the right side of the image when viewed from the driver 200. Between the first light-shielding wall 23a and the second light-shielding wall 23b, an opening 23c is provided, for example. In other words, the light-shielding wall 23 is disposed on both sides in an image width direction GW so as to sandwich an optical path 71 of the display light 70.

As illustrated in FIG. 3, an image 40 is displayed on the display face 20a. In the image 40, a range 40L visible to a left eye 201L of the driver 200 and a range 40R visible to a right eye 201R of the driver 200 are determined, depending on the width of the opening 23c of the light-shielding wall 23 and the position of the opening 23c. The visible ranges 40L, 40R are ranges along the image width direction GW.

The position of the eyes 201 illustrated in FIG. 3 is a position at the center of an eye box EB in a car width direction CW. The eye box EB is a range beforehand assumed as a range in which the position of the eyes 201 moves. The eye box EB has a predetermined width in the car width direction CW. The vehicle display device 1 is configured such that the image 40 is visible to the driver 200 when the eyes 201 are inside the eye box EB.

FIG. 4 illustrates a state in which the eyes 201 are positioned closer to the right side in the eye box EB. In this case, the range 40L visible to the left eye 201L and the range 40R visible to the right eye 201R are shifted leftward with respect to the positions illustrated in FIG. 3. Hence, a region visible to both eyes is shifted leftward, as compared with the case of FIG. 3. On the contrary, when the eyes 201 are positioned closer to the left side in the eye box EB, the visible ranges 40R, 40L are shifted rightward with respect to the positions illustrated in FIG. 3. That is, a range visible to both eyes of the driver 200 varies, depending on the position of the eyes 201 of the driver 200.

A first region 41 illustrated in FIG. 3 is an entire region visible to both eyes of the driver 200. More specifically, the first region 41 is a region visible to both eyes of the driver 200 even when the eyes 201 are positioned at any point in the eye box EB. A second region 42 illustrated in FIG. 3 is a region closer to ends in the image width direction GW than the first region 41 is. In other words, the second region 42 is a region, other than the first region 41, of the whole region of the image 40.

The second region 42 is a region visible only to a single eye of the driver 200 in some cases. The second region 42 includes a left end region 42a and a right end region 42b. The left end region 42a is positioned leftward of the first region 41 when viewed from the driver 200. The left end region 42a is a region visible only to the right eye 201R of the driver 200 in some cases. At least some of the left end region 42a may be visible to both eyes of the driver 200, depending on the position of the eyes 201.

The right end region 42b is positioned rightward of the first region 41 when viewed from the driver 200. The right end region 42b is a region visible only to the left eye 201L of the driver 200 in some cases. At least some of the right end region 42b may be visible to both eyes of the driver 200, depending on the position of the eyes 201.

A boundary line 43 between the first region 41 and the second region 42 is set in the image 40. The position of the boundary line 43 is fixed. The boundary line 43 according to the present embodiment includes a first boundary line 43a and a second boundary line 43b. The first boundary line 43a is a boundary line between the left end region 42a and the first region 41. The second boundary line 43b is a boundary line between the right end region 42b and the first region 41.

The first boundary line 43a is determined, based on the range 40L visible to the left eye 201L. More specifically, the first boundary line 43a is the left end of the range 40L when the eyes 201 are positioned in the leftmost portion of the eye box EB. In the image 40, a region leftward of the first boundary line 43a is not visible to the left eye 201L in some cases.

The second boundary line 43b is determined, based on the range 40R visible to the right eye 201R. More specifically, the second boundary line 43b is the right end of the range 40R when the eyes 201 are positioned in the rightmost portion of the eye box EB. In the image 40, a region rightward of the second boundary line 43b is not visible to the right eye 201R in some cases.

As described above, the first region 41 according to the present embodiment is ensured to be visible to both the eyes as long as the eyes 201 of the driver 200 are inside the eye box EB. In contrast, the second region 42 is a region not always visible to both eyes of the driver 200.

Here, as described below, when a figure extends over the boundary between the first region 41 and the second region 42, the visibility of the image 40 sometimes decreases. On the left side of FIG. 12, a figure image 50 displayed across the second boundary line 43b is illustrated. The figure image 50 is, for example, a linear figure extending along the image width direction GW or a rectangular image whose longitudinal direction is in agreement with the image width direction GW. A part of the figure image 50 is displayed in the first region 41, while a remaining part of the figure image 50 is displayed in the right end region 42b. At the center of FIG. 12, how the figure image 50 is viewed by the left eye 201L and how the figure image 50 is viewed by the right eye 201R are illustrated. A light-shielding wall 123 illustrated in FIG. 12 is a light-shielding wall of a comparative example, and light shielding effects are consistent across the entirety of the light-shielding wall 123.

Figure 12:
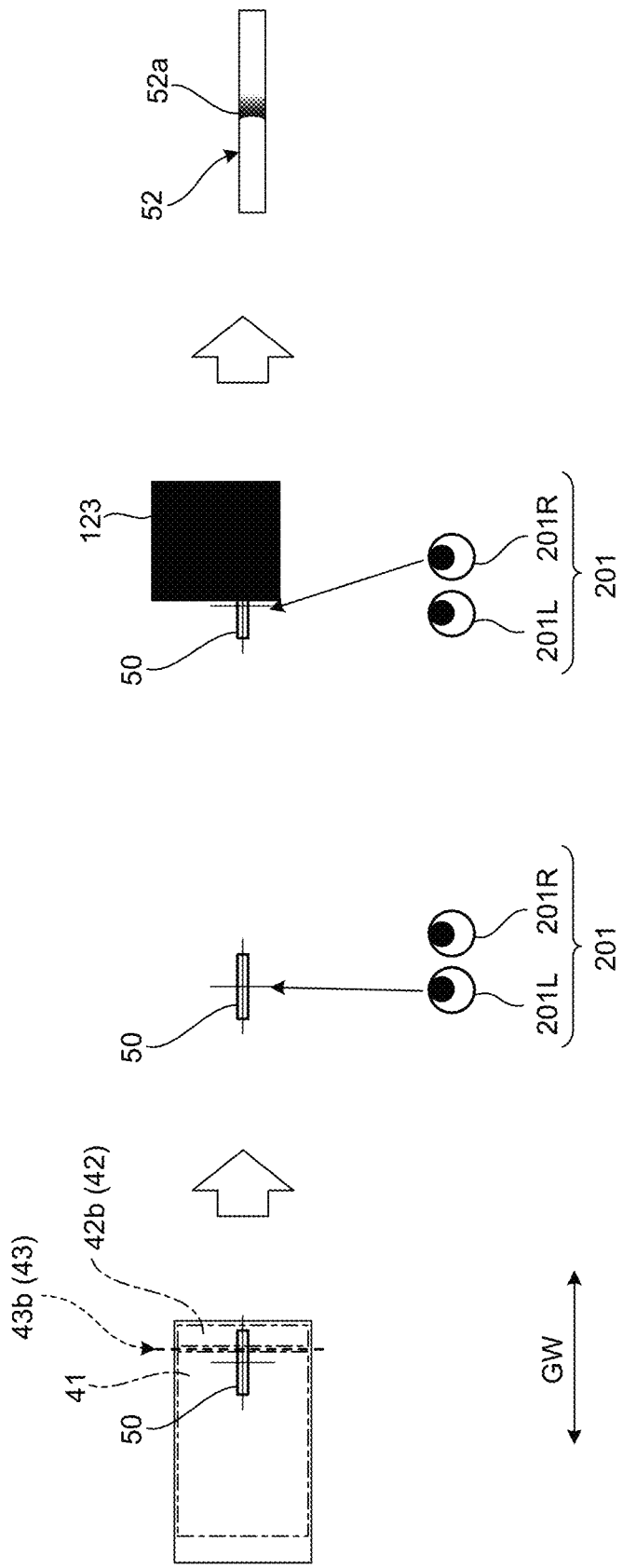
FIG. 12 is a diagram for explaining a decrease in the visibility of a figure image.

As illustrated in FIG. 12, the entirety of the figure image 50 is visible to the left eye 201L of the driver 200. In contrast, only a part of the figure image 50 is visible to the right eye 201R. A remaining part of the figure image 50 is hidden by the light-shielding wall 123. In this case, as illustrated on the right side of FIG. 12, a black line 52a sometimes occurs in a virtual image 52 visible to the driver 200. The line 52a occurs at the right end of the part of the figure image 50 visible to the right eye 201R. In other words, the line 52a occurs due to an edge of the light-shielding wall 123. A problem arises that the clear line 52a is mistakenly recognized because brightness discontinuously changes at the edge of the light-shielding wall 123.

Figure 13:
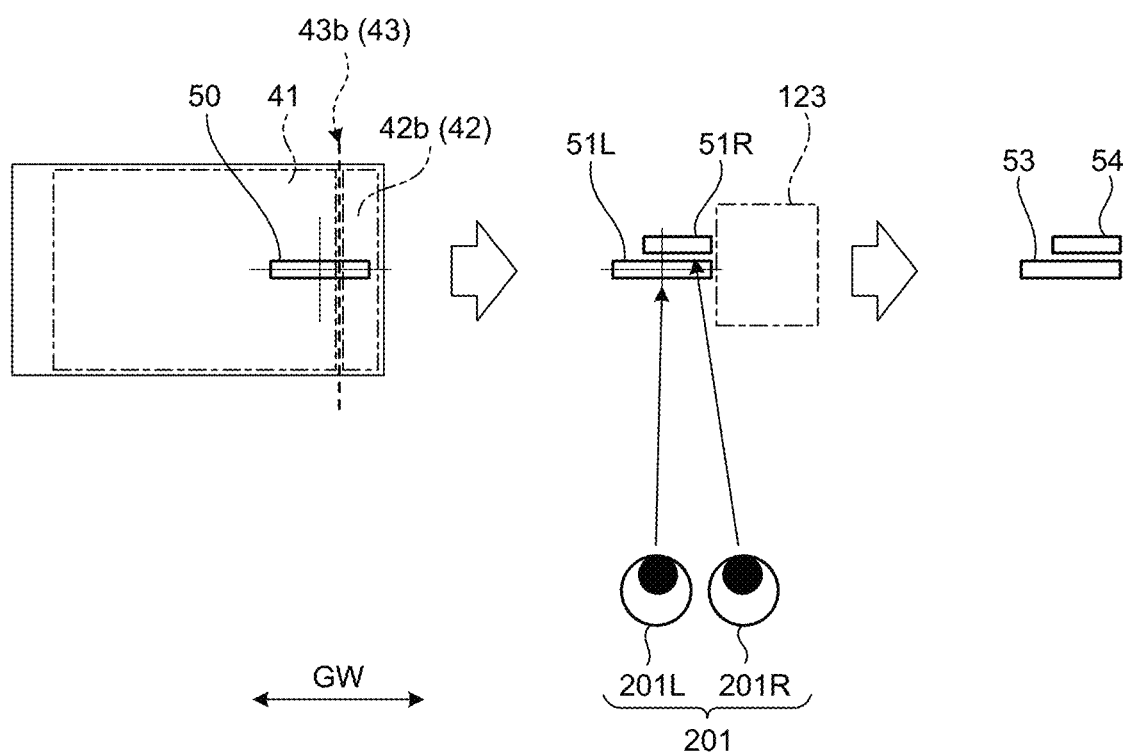
FIG. 13 is a diagram for explaining a decrease in the visibility of a figure image.

FIG. 13 is a diagram for explaining double images. As illustrated in FIG. 13, the position of a virtual image 51L visible to the left eye 201L and the position of a virtual image 51R visible to the right eye 201R are sometimes misaligned due to a parallax. Furthermore, when a part of the display light 70 is blocked by the light-shielding wall 123, the shape of the virtual image 51R visible to the right eye 201R differs from the shape of the virtual image 51L visible to the left eye 201L. As a result, the driver 200 mistakenly recognizes the figure image 50 as two different images 53, 54. The occurrence of such double images is annoying to the driver 200.

As illustrated in FIG. 5, the light-shielding wall 23 according to the present embodiment includes an adjustment part 26. FIG. 5 illustrates the light-shielding wall 23 viewed from the driver 200 overlapping with the display face 20a. Note that FIG. 5 illustrates the light-shielding wall 23 when the eyes 201 of the driver 200 are positioned at the center of the eye box EB. The adjustment part 26 is disposed at a position corresponding to the boundary between the first region 41 and the second region 42. The illustrated adjustment part 26 is disposed so as to overlap with the second region 42 and not to overlap with the first region 41 when the eyes 201 are positioned at the center of the eye box EB. More specifically, an end of the adjustment part 26, the end being closer to the center of the image, is positioned to correspond to the boundary line 43.

The first light-shielding wall 23a includes a first adjustment part 26a. The first adjustment part 26a is disposed to overlap with the left end region 42a when viewed from the driver 200. The first adjustment part 26a includes a first boundary line 27a and a second boundary line 27b. The first boundary line 27a and the second boundary line 27b extend along an image height direction GH.

The first boundary line 27a is a boundary line closer to an end in the image width direction GW in the first adjustment part 26a. The second boundary line 27b is a boundary line closer to the image center in the image width direction GW in the first adjustment part 26a. The second boundary line 27b may overlap with the first boundary line 43a of the image 40, or may be positioned slightly leftward of the first boundary line 43a. The first boundary line 27a is positioned closer to the end in the image width direction GW than the first boundary line 43a is, and overlaps with the left end region 42a. In other words, the first adjustment part 26a overlaps with a part of the left end region 42a, the part being closer to the image center.

The first adjustment part 26a is configured such that the amount of the display light 70 penetrating the first adjustment part 26a is reduced toward the end in the image width direction GW. The illustrated first adjustment part 26a has a gradation in which light transmittance decreases toward the end in the image width direction GW. In other words, the first adjustment part 26a is given a gradation such that light transmittance is the highest at the second boundary line 27b and light transmittance decreases toward the first boundary line 27a in the image width direction GW. The first adjustment part 26a is configured such that light transmittance is, for example, 0 [%] at the first boundary line 27a. In the first light-shielding wall 23a, the light transmittance of a portion leftward of the first boundary line 27a is, for example, 0 [%].

The second light-shielding wall 23b includes a second adjustment part 26b. The second adjustment part 26b is disposed to overlap with the right end region 42b when viewed from the driver 200. The second adjustment part 26b includes a first boundary line 28a and a second boundary line 28b. The first boundary line 28a and the second boundary line 28b extend along the image height direction GH.

The first boundary line 28a is a boundary line closer to an end in the image width direction GW in the second adjustment part 26b. The second boundary line 28b is a boundary line closer to the image center in the image width direction GW in the second adjustment part 26b. The second boundary line 28b may overlap with the second boundary line 43b of the image 40, or may be positioned slightly rightward of the second boundary line 43b. The first boundary line 28a is positioned closer to the end in the image width direction GW than the first boundary line 43b is, and overlaps with the right end region 42b. In other words, the second adjustment part 26b overlaps with a part of the right end region 42b, the part being closer to the image center.

The second adjustment part 26b is configured such that the amount of the display light 70 penetrating the second adjustment part 26b is reduced toward an end in the image width direction GW. The illustrated second adjustment part 26b has a gradation in which light transmittance decreases toward the end in the image width direct GW. The second adjustment part 26b is given the gradation such that light transmittance is the highest at the second boundary line 28b, and light transmittance decreases toward the first boundary line 28a in the image width direction GW. The second adjustment part 26b is configured such that light transmittance is, for example, 0 [%] at the first boundary line 28a. In the second light-shielding wall 23b, the light transmittance of a portion rightward of the first boundary line 28a is 0 [%], for example.

FIG. 6 is a diagram for explaining an image visible to the driver 200 in the present embodiment. As illustrated on the left side of FIG. 6, the figure image 50 is displayed at a point intersecting the second boundary line 43b. As illustrated at the center of FIG. 6, the left eye 201L of the driver 200 visually recognizes the entirety of the figure image 50. The right eye 201R can visually recognize a part of the figure image 50. Here, when viewed by the right eye 201R, the second adjustment part 26b overlaps with the figure image 50. Since the second adjustment part 26b has the gradation, the right edge of the figure image 50 is made blurry. More specifically, the brightness of the figure image 50 viewed by the right eye 201R decreases toward the right edge of the figure image 50. Therefore, the right edge of the figure image 50 viewed by the right eye 201R is not clear. Furthermore, since the gradation is given to the left end of the second light-shielding wall 23b, the edge of the second light-shielding wall 23b is inconspicuous. Therefore, as illustrated on the right side of FIG. 6, the line 52a of the virtual image 52 is made blurry, so that the driver 200 scarcely feels uncomfortable. Furthermore, the difference between the shape of the figure image 50 viewed by the left eye 201L and the shape of the figure image 50 viewed by the right eye 201R is smaller. Thus, double images scarcely occur.

As described above, the vehicle display device 1 according to the present embodiment is capable of enhancing the visibility of the figure image 50 displayed in the boundary between the first region 41 and the second region 42. Note that the above-described light-shielding wall 23 is formed by, for example, painting a transparent resin plate black. The first adjustment part 26a is painted in such a manner that light transmittance increases from the first boundary line 27a toward the second boundary line 27b. The second adjustment part 26b is painted such that light transmittance increases from the first boundary line 26a toward the second boundary line 28b.

The adjustment part 26 may be provided in the cover member 3, the cover 5, or a mirror holder, in place of the illustrated light-shielding wall 23. FIG. 7 is a diagram of the adjustment part 26 provided in the cover member 3. The adjustment part 26 is provided, for example, in the wall 30. The adjustment part 26 is configured such that light transmittance decreases toward the end in the image width direction GW. The adjustment part 26 allows a part of the display light 70 to penetrate, and thereby enhances the visibility of the image 40 displayed in the vicinity of the boundary line 43. When the adjustment part 26 is provided in the cover member 3, the light-shielding wall 23 is preferably disposed so as not to overlap with the adjustment part 26 when viewed from the driver 200. Alternatively, in the case where the adjustment part 26 is provided in the cover member 3, the cover member 3 may double as the light-shielding wall 23.

FIG. 8 illustrates an adjustment part 26 provided in the cover 5. In the case where the adjustment part 26 is provided in the cover 5, the adjustment part 26 is disposed at an end in the image width direction GW of the cover 5, as illustrated in FIG. 8. The adjustment part 26 is configured such that light transmittance decreases toward the end in the image width direction GW. The adjustment part 26 is formed by, for example, painting the cover 5. The light-shielding wall 23 is preferably disposed so as not to overlap with the adjustment part 26 when viewed from the driver 200. Alternatively, in the case where the adjustment part 26 is provided in the cover 5, the cover 5 may double as the light-shielding wall 23.

FIG. 9 is a diagram of an adjustment part 26 provided in the first mirror 22. The first mirror 22 includes a mirror main body 22a and a mirror holder 22b configured to hold the mirror main body 22a. The mirror main body 22a reflects the display light 70 by the use of a concave reflection face 22r. The mirror holder 22b is, for example, engaged with an edge of the mirror main body 22a to hold the mirror main body 22a. The adjustment part 26 is provided in both ends in the image width direction GW of the mirror holder 22b. The mirror holder 22b is formed from a transparent resin, for example. The adjustment part 26 is formed by, for example, painting a transparent resin black. A region as the adjustment part 26 is painted such that light transmittance decreases toward the ends in the image width direction GW. The light-shielding wall 23 is preferably disposed so as not to overlap with the adjustment part 26 when viewed from the driver 200. Alternatively, in the case where the adjustment part 26 is provided in the mirror holder 22b, the mirror holder 22b may function as a view-obstructing member similar to the light-shielding wall 23.

The adjustment part 26 may be provided in the display face 20a. In this case, the adjustment part 26 is provided in both ends in the image width direction GW of the display face 20a. The adjustment part 26 is formed by, for example, painting the display face 20a.

As described above, the vehicle display device 1 according to the present embodiment includes the image display 20, the optical system 25, and the adjustment part 26. The image display 20 is configured to emit the display light 70 of the image 40. The optical system 25 is configured to project the display light 70 emitted from the image display 20 onto the reflection face 102a ahead of the driver 200. The adjustment part 26 is provided in the optical path 71 of the display light 70 from the image display 20 to the reflection face 102a.

The image 40 includes the first region 41, which is a region visible to both eyes of the driver 200, and the second region 42, which is a region that is closer to the ends in the image width direction GW than the first region 41 in the image 40 is. The adjustment part 26 is disposed at a position corresponding to the boundary between the first region 41 and the second region 42. The adjustment part 26 is configured such that the amount of the display light 70 penetrating the adjustment part 26 is reduced toward the ends in the image width direction GW. The vehicle display device 1 according to the present embodiment is capable of enhancing the visibility of an image displayed on a boundary portion between the first region 41 and the second region 42.

The adjustment part 26 according to the present embodiment has a gradation in which light transmittance decreases toward the ends in the image width direction GW. With the gradation, light transmittance can be gradually changed along the image width direction GW. Thus, the visibility of an image can be suitably enhanced.

Note that, in the above-described embodiment, the adjustment part 26 is positioned closer to the ends in the image width direction GW than the boundary line 43 is. However, the position of the adjustment part 26, that is a position corresponding to the boundary between the first region 41 and the second region 42, is not limited to the illustrated position. For example, the adjustment part 26 may not only overlap with the second region 42, but also overlap with the first region 41. To give an example, in the case where the eyes 201 of the driver 200 are positioned at the center of the eye box FB, a part of adjustment part 26 may overlap with the first region 41 when viewed from the driver 200.

The reflection face 102a of the windshield 102 is an example of a reflection face disposed ahead of the driver 200. As the reflection face, for example, a combiner disposed ahead of the driver 200 may be used. In addition to the first mirror 22, the optical system 25 may include another mirror.

[First Modification of Embodiment]

Figure 10:
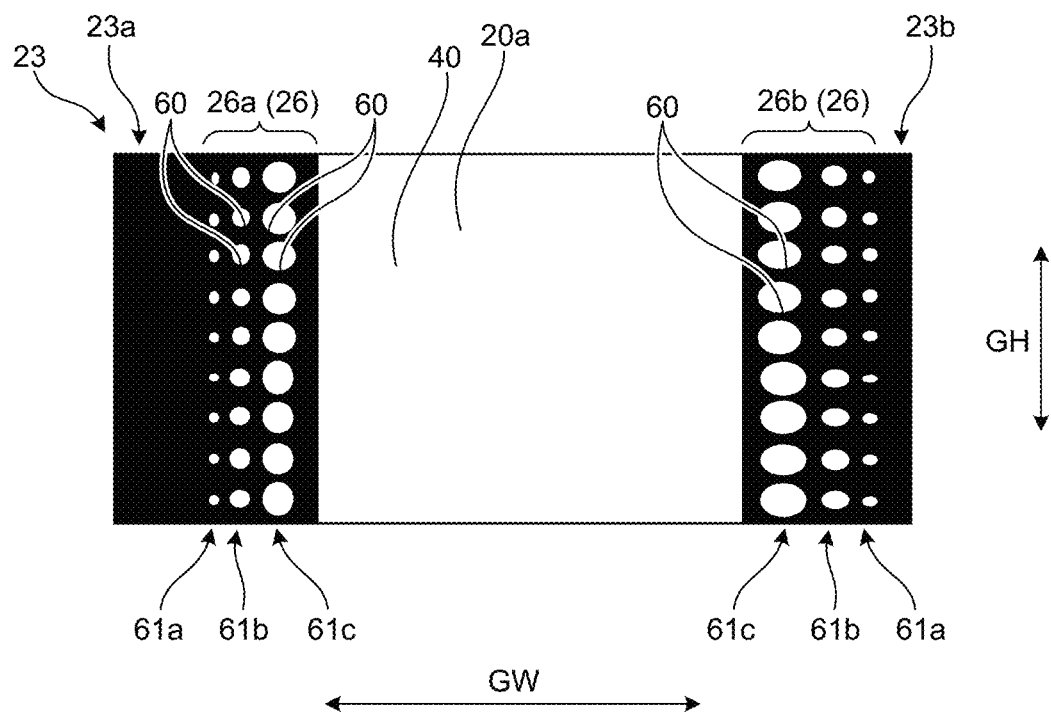
FIG. 10 is a diagram of an adjustment part according to a first modification of the embodiment.

A first modification of the embodiment will be described. FIG. 10 is a diagram of an adjustment part according to the first modification of the embodiment. Differently from the adjustment part 26 according to the above-described embodiment, the adjustment part 26 according to the first modification is configured to adjust the amount of transmittance of the display light 70 by the use of the area of a hole 60. Like the adjustment part 26 according to the above-described embodiment, the adjustment part 26 illustrated in FIG. 10 is provided in the light-shielding wall 23.

The adjustment part 26 includes a plurality of the holes 60. The illustrated holes 60 have a circular shape. The holes 60 are formed by, for example, painting a transparent resin plate with masking. In other words, the holes 60 are non-colored regions to which paint is not applied. In the adjustment part 26, a region except the holes 60 is a non-transmissive region covered with black paint.

The holes 60 are arranged along the image height direction GH and the image width direction GW. In the illustrated adjustment part 26, hole groups 61a, 61b, 61c are provided in their respective three columns. Each of the hole groups 61a, 61b, 61c has a plurality of the holes 60 lined up in the image height direction GW. Each of the hole groups 61a, 61b, 61c has the same number of the holes 60. Among the three hole groups 61a, 61b, 61c, the first hole group 61a is positioned closest to the ends in the image width direction GW. The third hole group 61c is positioned closest to the center of an image in the image width direction GW. The second hole group 61b is in an intermediate position between the first hole group 61a and the third hole group 61c.

A plurality of the holes 60 belonging to the first hole group 61a each has the same opening area. Similarly, a plurality of the holes 60 belonging to the second hole group 61b each has the same opening area, and a plurality of the holes 60 belonging to the third hole group 61c each has the same opening area. The opening area of each of the holes 60 belonging to the first hole group 61a is smaller than the opening area of each of the holes 60 belonging to the other hole groups 61b, 61c. In other words, the first hole group 61a allows a smaller amount of the display light 70 to pass therethrough, as compared with the second hole group 61b and the third hole group 61c. The opening area of each of the holes 60 belonging to the third hole group 61c is larger than the opening area of each of the holes 60 belonging to the other hole groups 61a, 61b. In other words, the third hole group 61c allows more display light 70 to pass therethrough, as compared with the first hole group 61a and the second hole group 61b.

Accordingly, in the adjustment part 26, the amount of the display light 70 penetrating a region provided with the third hole group 61c is larger than the amount of the display light 70 penetrating other regions. On the other hand, in the adjustment part 26, the amount of the display light 70 penetrating a region provided with the first hole group 61a is smaller than the amount of the display light 70 penetrating other regions. As described above, the adjustment part 26 according to the first modification is configured such that the amount of the display light 70 penetrating the adjustment part 26 is reduced toward the ends in the image width direction GW.

As described above, the adjustment part 26 according to the first modification of the embodiment has the holes 60 through which the display 70 passes through. The holes 60 are arranged along the image width direction GW. Opening areas of the holes 60 become smaller toward the ends in the image width direction GW. This configuration allows the figure image 50 to be made blurry or a view-obstructing edge to be inconspicuous.

Note that, to make size comparisons among the opening areas of the holes 60, the opening areas between each one of the holes 60 may be compared with one another, or the opening areas of the holes 60 in a unit area of the adjustment part 26 may be compared with one another. For example, all the holes 60 provided in the adjustment part 26 may have the same opening area. In this case, the adjustment part 26 may be configured such that a relatively large number of holes 60 are disposed in a region closer to the center of the image, and a relatively small number of holes 60 are disposed in a region closer to the ends of the image. In other words, the density of the holes 60 may be lowered toward the ends of the image from the center of the image.

Note that the shape of each of the holes 60 is not limited to a circular shape. The holes 60 may have, for example, a long and narrow slit shape along the image height direction GW. The holes 60 having the slit shape are arranged along the image width direction GW. In this case, the slit width of the holes 60 becomes narrower toward the ends in the image width direction GW.

Note that the light-shielding wall 23 may be formed from, for example, resin or metal having light blocking effects, in place of the transparent resin. In this case, the holes 60 of the adjustment part 26 are through holes provided in the light-shielding wall 23. The adjustment part 26 according to the first modification may be provided in the cover member 3, the cover 5, the mirror holder 22b, or the display face 20a, in place of the light-shielding wall 23.

[Second Modification of Embodiment]

Figure 11:
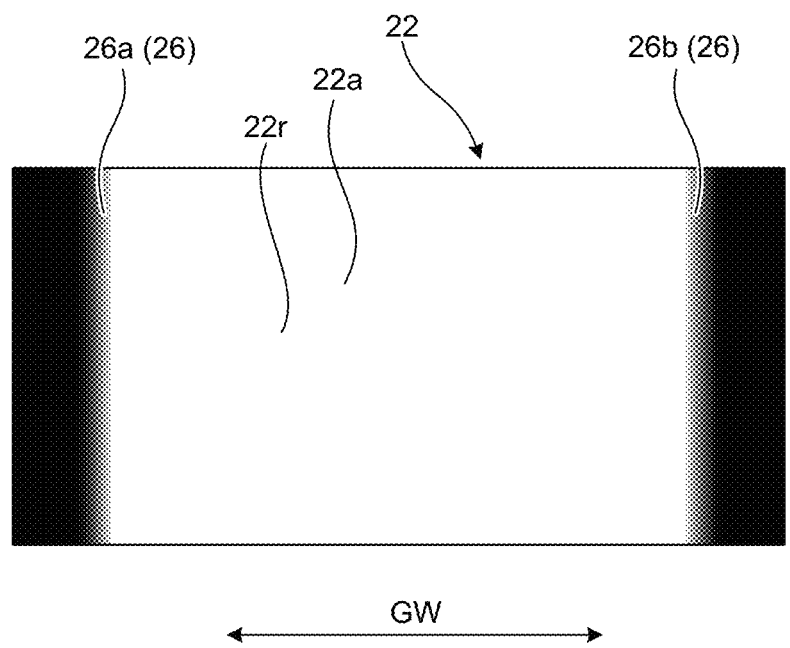
FIG. 11 is a diagram of an adjustment part according to a second modification of the embodiment.

A second modification of the embodiment will be described. FIG. 11 is a diagram of an adjustment part according to the second modification of the embodiment. Differently from the adjustment part 26 according to the above-described embodiment, the adjustment part 26 according to the second modification is provided in the first mirror 22.

As illustrated in FIG. 11, the adjustment part 26 is formed in the reflection face 22r of the mirror main body 22a. The adjustment part 26 is formed by masking ends in the image width direction GW of the reflection face 22r. The adjustment part 26 may be formed by, for example, applying vapor deposition or painting to the reflection face 22r. The adjustment part 26 has a gradation in which light transmittance decreases toward the ends in the image width direction GW.

[Third Modification of Embodiment]

In the above-described embodiment, at both ends in the image width direction GW of the image 40, a range not visible to both eyes occurs. However, the range not visible to both eyes may be provided only on one side in the image width direction GW. For example, the vehicle display device 1 may be configured such that, in the image 40, the left end region 42a occurs meanwhile the right end region 42b does not occur. In this case, the second adjustment part 26b may not be provided. The vehicle display device 1 may be configured such that, in the image 40, the right end region 42b occurs meanwhile the left end region 42a does not occur. In this case, the first adjustment part 26a may not be provided.

Contents disclosed in the foregoing embodiment and the modifications may be implemented in combination as appropriate.

The vehicle display device according to the embodiment includes the adjustment part disposed in the optical path of the display light. An image includes: a first region visible to driver's both eyes; and a second region that is closer to the ends in the image width direction than the first region in the image is. The adjustment part is disposed at a position corresponding to the boundary between the first region and the second region. The adjustment part is configured such that the amount of the display light penetrating the adjustment part is reduced toward the ends in the image width direction. The vehicle display device according to the embodiment produces the effect of preventing a decrease in visibility by making the image blurry in the boundary between the first region and the second region.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device, comprising:
   an image display configured to emit display light of an image;
   an optical system configured to project the display light emitted from the image display onto a reflection face ahead of a driver; and
   an adjustment part provided in an optical path of the display light from the image display to the reflection face, wherein
   the image includes:
      a first region being an entire region visible to both eyes of the driver when the eyes are positioned at any point in an eye box, the eye box being a range beforehand assumed as a range in which the position of the eyes moves; and
      a second region is a region, other than the first region, of the whole region of the image and that is closer to ends in an image width direction than the first region in the image is,
   the adjustment part is disposed at a position corresponding to a boundary between the first region and the second region, and
   the adjustment part is configured such that an amount of the display light penetrating the adjustment part is reduced toward the ends in the image width direction.

2. The vehicle display device according to claim 1, wherein
   the adjustment part has a gradation in which light transmittance decreases toward the ends in the image width direction.

3. The vehicle display device according to claim 1, wherein
   the adjustment part includes a plurality of holes through which the display light passes,
   the holes are arranged along the image width direction, and
   opening areas of the holes become smaller toward the ends in the image width direction.

4. A vehicle display device, comprising:
   an image display configured to emit display light of an image;
   an optical system configured to project the display light emitted from the image display onto a reflection face ahead of a driver; and
   an adjustment part provided in an optical path of the display light from the image display to the reflection face, wherein
   the image includes:
      a first region being an entire region visible to both eyes of the driver when the eyes are positioned at any point in an eye box, and
      a second region that is a region closer to ends in an image width direction than the first region in the image,
   the eye box is a range beforehand assumed as a range in which the position of the eyes moves,
   the second region is a region visible only to a single eye of the driver,
   the adjustment part is disposed at a position corresponding to a boundary between the first region and the second region, and
   the adjustment part is configured such that an amount of the display light penetrating the adjustment part is reduced toward the ends in the image width direction.

* * * * *